July 17, 1928.

A. R. SMITH 1,677,691

MEANS FOR MEASURING A SUBSTANCE CARRIED IN
SUSPENSION BY A SECOND SUBSTANCE

Filed Feb. 20, 1925

Inventor
Arthur R. Smith
by
His Attorney

Patented July 17, 1928.

1,677,691

UNITED STATES PATENT OFFICE.

ARTHUR R. SMITH, OF SCHENECTADY, NEW YORK, ASSIGNOR, BY MESNE ASSIGNMENTS, TO BAILEY METER COMPANY, A CORPORATION OF DELAWARE.

MEANS FOR MEASURING A SUBSTANCE CARRIED IN SUSPENSION BY A SECOND SUBSTANCE.

Application filed February 20, 1925. Serial No. 10,706.

It is sometimes desired to measure the quantity of a substance carried in suspension by a second substance, and the object of my invention is to provide an improved means for accomplishing this result.

For a consideration of what I believe to be novel and my invention, attention is directed to the accompanying description and the claims appended thereto.

In the present application I have illustrated and described an embodiment of my invention wherein it is utilized for measuring the amount of powdered coal suspended in air, this being a use to which my invention is well adapted. It is to be understood, however, that the invention is not necessarily limited to such use.

Figure 1:
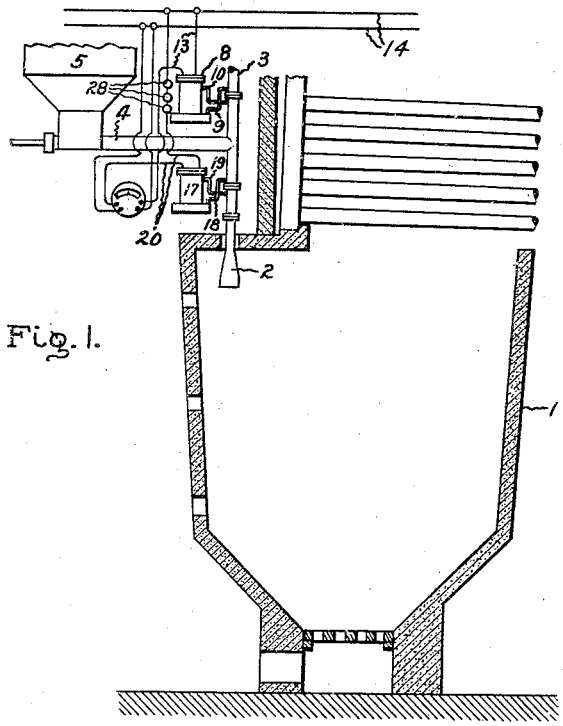
Figure 2:
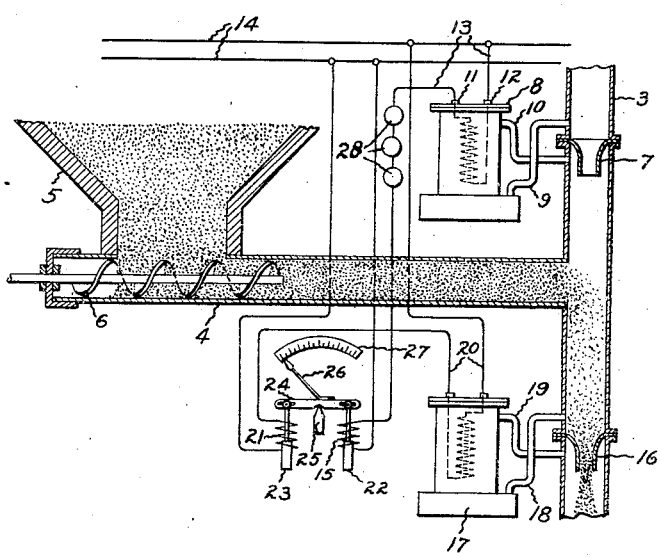

In the drawing, Fig. 1 is a diagrammatic view, partly in section, showing my invention used for measuring powdered coal supplied to a furnace, and Fig. 2 is a diagrammatic view, partly in section and on a larger scale, of certain of the parts shown in Fig. 1.

Referring to the drawing, 1 indicates a furnace to which powdered coal and air is supplied through a burner 2. Connected to burner 2 is a supply conduit 3 to which air is supplied from any suitable source, and connected to conduit 3 is a conduit 4 through which powdered coal is fed to the air, the coal and air mixture flowing to the burner 2. The powdered coal may be fed through conduit 4 from a hopper 5 by means of a screw feed device 6, the rate being controlled by regulating the speed of rotation of the screw. The arrangement so far described is to be taken as typical of any suitable means for feeding a mixture of powdered coal and air to a furnace.

Now, according to the embodiment of my invention illustrated in the drawing, I provide an electric flow meter comprising two pressure difference creating devices and two pressure responsive devices and connect them with conduit 3 and with an indicating mechanism in such way that the meter thus formed will measure the amount of powdered coal passing through conduit 3.

Referring specifically to Fig. 2, 7 indicates a pressure difference creating device which is located in conduit 3 in advance of conduit 4 as regards flow through conduit 3, and which creates a pressure difference which bears a definite relation to the rate of flow through conduit 3 at the point where it is located. That is to say, the pressure difference creating device 7 creates a pressure difference which bears a definite relation to the rate of flow of air through conduit 3. 8 indicates a pressure responsive device connected to pressure difference creating device 7 by the leading pressure pipe 9 and the trailing pressure pipe 10. The pressure responsive device 8, which is indicated diagrammatically in the drawing, may be of any suitable type which creates a flow of electric current proportional to the pressure difference applied to it, such devices being now known in this art. For example, it may be a pressure responsive device of the general type of that described and claimed in the patent to Thompson and McNairy, No. 1,560,951, granted November 10, 1925, this being the type indicated in the drawing.

The two terminals 11 and 12 of pressure responsive device 8 are connected by circuit wires 13 to a source of alternating current 14 of suitable potential and in the electrical circuit formed by these wires is a solenoid winding 15. The current flowing through winding 15, therefore, is one which bears a definite relation to the rate of flow of air through conduit 3.

In conduit 3 beyond conduit 4 as regards the direction of flow through conduit 3, is arranged a second pressure difference creating device 16 through which the mixture of air and powdered coal flows. At 17 is a pressure responsive device which may be similar to the pressure responsive device 8 and which is connected to pressure difference creating device 16 by the leading pressure pipe 18 and the trailing pressure pipe 19. The terminals of device 17 are connected by circuit wires 20 to source of alternating current supply 14 and in such circuit is a solenoid winding 21 similar to solenoid winding 15. There thus flows in solenoid winding 21 a current which bears a definite relation to the rate of flow of the mixture of powdered coal and air.

Associated with solenoid windings 15 and 21 are two solenoid plungers 22 and 23 connected to a beam 24 supported on a knife-edge 25. Carried by beam 24 is an indicating pointer 26 which moves over a suitable scale plate 27. Solenoid windings 15 and 21 are arranged to act in opposition to each other and the arrangement is such that with no current or equal currents flowing in solenoid windings 15 and 21 the pulls upward on plungers 22 and 23 balance each other so that pointer 26 stands in a position which may be termed the zero position of the instrument. This is the position shown in the drawing.

The operation is as follows:—

Assume that the furnace is burning and that air and powdered coal are being fed to it through conduits 3 and 4. The air flowing through pressure difference creating device 7 will create a pressure difference which bears a definite relation to the rate of flow of the air and this will cause a current to flow through solenoid winding 15, which current bears a definite relation to the rate of flow of air. Likewise the flow of air and powdered coal through pressure difference creating device 16 will create a pressure difference which bears a definite relation to the rate of flow of the air and coal mixture and this pressure difference will effect a flow of current in solenoid winding 21 which bears a definite relation to the rate of flow of the mixture of air and powdered coal.

The quantity of air flowing through the pressure difference creating device 16 is the same as that flowing through the pressure difference creating device 7, but due to the addition of the powdered coal to it, the density of the mixture flowing through the pressure difference creating device 16 is greater and hence the pressure difference set up by the pressure difference creating device 16 is greater than that set up by the pressure difference creating device 7 by an amount proportional to the increase in the density of the mixture, which of course is due to the addition of the powdered coal to it. The difference in the amount of current flowing through solenoid windings 15 and 21 therefore becomes a measure of the amount of coal flowing during a given time through the conduit 3 and as will be clear, since solenoid windings 15 and 21 are opposed to each other, it is this difference which is measured by the indicating pointer 26. The scale plate 27 may be calibrated directly in terms of pounds of coal per unit of time so that the instrument will show the rate coal actually is being fed to the furnace. In addition, if desired, there may be provided in circuit wires 20 suitable measuring instruments as indicated at 28 which will measure the amount of air flowing through conduit 3. It will thus be possible by means of the instruments to read both the amount of air and the amount of coal being fed to the furnace.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with a conduit through which a fluid flows and to which at a point in the conduit a substance is fed into the fluid, of means for measuring the amount of the substance per unit of time fed into the conduit, said means comprising a pressure difference creating device which creates a pressure difference which bears a definite relation to the rate of flow of the fluid, a pressure difference creating device which creates a pressure difference which bears a definite relation to the rate of flow of the mixture, and measuring means responsive to the difference between the two pressure differences created.

2. The combination with a conduit through which a fluid flows and to which at a point in the conduit a substance is fed into the fluid, of means for measuring the amount of the substance per unit of time fed into the conduit, said means comprising a pressure difference creating device which creates a pressure difference which bears a definite relation to the rate of flow of the fluid, a pressure difference creating device which creates a pressure difference which bears a definite relation to the rate of flow of the mixture, means for effecting a flow of electric current proportional to the difference between the two pressure differences created, and means for measuring such current.

3. The combination with a conduit through which a fluid flows and to which at a point in the conduit a substance is fed into the fluid, of means for measuring the amount of the substance per unit of time fed into the conduit, said means comprising a pressure difference creating device which creates a pressure difference which bears a definite relation to the rate of flow of the fluid, a pressure difference creating device which creates a pressure difference which bears a definite relation to the rate of flow of the mixture, means for effecting a flow of electric current which bears a definite relation to each of said pressure differences, and means for measuring the difference between said currents.

4. Means for measuring the amount of powdered coal supplied per unit of time to a furnace by an air stream, said means comprising a pressure difference creating device which creates a pressure difference which bears a definite relation to the air flow, a pressure difference creating device which creates a pressure difference which bears a definite relation to the combined air and coal flow, and means for measuring the difference between said two pressure differences.

5. The combination with a conduit through which a fluid flows and to which at a point in the conduit a substance is fed into the fluid, of means for measuring the amount of the substance per unit of time fed into the conduit, said means comprising a device which creates a force which is a measure of the fluid flow, a device which creates a force which is a measure of the flow of the mixture of fluid and substance, and means for measuring the difference between said two forces.

6. The combination with a conduit through which fluid flows and to which at a point in the conduit a substance is fed into the fluid, of means associated with said conduit in advance of said point for measuring the flow of fluid in the conduit, means associated with said conduit beyond said point for measuring the flow of the mixture through said conduit, and a device for measuring the difference between the quantities measured by said two means.

7. The combination with a conduit through which a fluid flows and to which at a point in the conduit a substance is fed into the fluid, of means for measuring the amount of the substance per unit of time fed into the conduit, said means being characterized by the fact that it indicates the difference between the flow of fluid before the substance is fed into it and the total flow after the substance is fed into it.

In witness whereof, I have hereunto set my hand this 19th day of February, 1925.

ARTHUR R. SMITH.